United States Patent
Busen et al.

(10) Patent No.: US 12,093,029 B2
(45) Date of Patent: Sep. 17, 2024

(54) INTEGRATED RECORD OF ASSET USAGE, MAINTENANCE, AND CONDITION, AND ASSOCIATED SYSTEMS AND METHODS

(71) Applicant: Caterpillar Inc., Peoria, IL (US)

(72) Inventors: Melissa A. Busen, Chicago, IL (US); Daniel J. Reaume, Midland, MI (US); Kyle J. Cline, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/581,807

(22) Filed: Jan. 21, 2022

(65) Prior Publication Data

US 2023/0236588 A1 Jul. 27, 2023

(51) Int. Cl.
| | | |
|---|---|---|
| *G05B 23/02* | (2006.01) | |
| *G06Q 10/0637* | (2023.01) | |
| *G06Q 10/20* | (2023.01) | |

(52) U.S. Cl.
CPC ..... *G05B 23/0283* (2013.01); *G05B 23/0264* (2013.01); *G06Q 10/06375* (2013.01); *G06Q 10/20* (2013.01)

(58) Field of Classification Search
CPC ................. G05B 23/0283; G05B 23/0264
USPC ....................................................... 702/184
See application file for complete search history.

(56) References Cited

U.S. PATENT DOCUMENTS

| | | | |
|---|---|---|---|
| 7,778,841 B1 | 8/2010 | Bayer et al. | |
| 9,697,544 B1 | 7/2017 | Bayer et al. | |
| 9,928,477 B2 | 3/2018 | Wallace | |
| 10,755,327 B2 | 8/2020 | Nagla | |
| 11,017,302 B2* | 5/2021 | McElhinney | G06Q 10/00 |
| 11,017,321 B1* | 5/2021 | Mishra | G05B 23/0283 |
| 11,100,728 B2 | 8/2021 | Goluguri et al. | |
| 11,126,975 B2 | 9/2021 | Haldenby et al. | |
| 2002/0077711 A1* | 6/2002 | Nixon | C10G 11/187 |
| | | | 700/51 |
| 2002/0082966 A1* | 6/2002 | O'Brien | G06Q 30/06 |
| | | | 705/36 R |
| 2003/0206620 A1* | 11/2003 | Taylor | H04L 43/0817 |
| | | | 379/229 |
| 2008/0086320 A1* | 4/2008 | Ballew | G06Q 10/00 |
| | | | 705/342 |
| 2014/0149416 A1* | 5/2014 | Wallace | G06F 16/285 |
| | | | 707/736 |
| 2018/0173217 A1* | 6/2018 | Spiro | G05B 23/0235 |

(Continued)

OTHER PUBLICATIONS

Wikipedia, May 31, 2020 (May 31, 2020), XP002808779, Retrieved from the Internet: URL:https://en.wikipedia.org/wiki/Blockchain#:~:text=A%20blockchain%20is%20a%20distributed%20ledger%20with%20growing,tree%2C%20where%20data%20nodes%20are%20represented%20by%20leaves%29.%29 [retrieved on Mar. 7, 2023].

(Continued)

*Primary Examiner* — Paul D Lee

(57) ABSTRACT

Systems and methods for improving recordkeeping and analysis of an asset include creating and maintaining an integrated record about the asset. In some embodiments, the systems and methods include collecting data about an asset to form an asset data collection, recording the asset data collection in a record, analyzing at least a portion of the asset data collection to determine a characteristic of the asset, and recording the characteristic of the asset in the record. In some embodiments, recording the characteristic in the record includes adding the characteristic to the asset data collection.

23 Claims, 5 Drawing Sheets

(56) References Cited

U.S. PATENT DOCUMENTS

| | | | |
|---|---|---|---|
| 2018/0324154 A1* | 11/2018 | Crabtree | ............... H04L 9/3236 |
| 2019/0146470 A1 | 5/2019 | Akkaram et al. | |
| 2019/0220861 A1* | 7/2019 | Silver | ................... H04L 9/3239 |
| 2019/0339678 A1* | 11/2019 | Biernat | ............ G05B 19/41865 |
| 2019/0354922 A1 | 11/2019 | Berti et al. | |
| 2020/0158534 A1* | 5/2020 | Benkert | ................. G01D 21/00 |
| 2020/0174912 A1* | 6/2020 | Sanghvi | .............. G06F 11/3688 |
| 2020/0175617 A1* | 6/2020 | Martinez | ............ G06Q 30/0283 |
| 2020/0342528 A1* | 10/2020 | Zhu | ...................... G06Q 20/389 |
| 2021/0122489 A1* | 4/2021 | Maraj | .................. H04L 63/123 |

OTHER PUBLICATIONS

Written Opinion and International Search Report for Int'l. Patent Appln. No. PCT/US2023/010371, mailed Mar. 29, 2023 (11 pgs).

* cited by examiner

INTEGRATED RECORD OF ASSET USAGE, MAINTENANCE, AND CONDITION, AND ASSOCIATED SYSTEMS AND METHODS

TECHNICAL FIELD

The present disclosure relates to an integrated record of asset usage, maintenance, condition, and/or other aspects, and associated systems and methods.

BACKGROUND

Assets, such as equipment (including vehicles and construction machines) may have value that depends on their condition and history. However, information about condition and history may be vast, complicated, decentralized, disorganized, or even unavailable. For example, an operator may have information about usage. If the asset has been owned by several operators, usage information may be distributed among the several operators. A servicer may have information about maintenance and condition. If multiple servicers have performed maintenance or evaluated asset condition, the maintenance and condition information may be distributed among the several servicers. The distributed and decentralized nature of information about an asset presents a challenge when there is a need to evaluate the value of the asset, its condition, or other aspects, because multiple sources may need to be consulted, which may not be possible, and information may have been lost over time. The distributed and decentralized nature of information about an asset also presents a risk that information is inaccurate, insecure, or at risk of tampering or falsification, which reduces trust in the information. Large amounts of information about an asset may be too complex to be useful in its raw form.

Efforts have been made to use blockchain ledger data structures to store information about an asset. For example, U.S. Pat. No. 11,126,975 ("Haldenby") relates to tracking ownership and usage of assets, and acting upon one or more rules in response to a triggering event. However, the disclosure of Haldenby fails to provide an adequate way to determine a comprehensible characteristic about the asset based on large amounts of data in the ledger, such as a characteristic of usage, maintenance, condition.

Accordingly, there remains a need for an integrated record of asset usage, maintenance, condition, and/or other aspects of assets such as equipment. For example, there remains a need for an improvement in information management that facilitates organization and utility of large amounts of data about an asset. Systems and methods according to embodiments of the present technology, as described herein, and variants thereof, are directed toward overcoming one or more of the deficiencies described above.

SUMMARY

In some embodiments, a computer-implemented method for improving recordkeeping of an asset includes creating and maintaining an integrated record about the asset. In some embodiments, the method includes collecting data about an asset to form an asset data collection, recording the asset data collection in a record, analyzing at least a portion of the asset data collection to determine a characteristic of the asset, and recording the characteristic of the asset in the record. In some embodiments, recording the characteristic in the record includes adding the characteristic to the asset data collection.

In some embodiments, a system for improving recordkeeping of an asset with an integrated record about the asset includes one or more processors one or more memory devices having stored thereon instructions that when executed by the one or more processors cause the one or more processor to: collect data about an asset to form an asset data collection; record the asset data collection in a record; analyze at least a portion of the asset data collection to determine a characteristic of the asset; and record the characteristic of the asset in the record. In some embodiments, recording the characteristic in the record includes adding the characteristic to the asset data collection.

In some embodiments, one or more non-transitory computer-readable media store(s) computer-executable instructions that, when executed by one or more processors, cause the one or more processors to perform operations including: collecting data about an asset to form an asset data collection; recording the asset data collection in a record; analyzing at least a portion of the asset data collection to determine a characteristic of the asset; and recording the characteristic of the asset in the record. In some embodiments, recording the characteristic in the record includes adding the characteristic to the asset data collection.

Other aspects will appear hereinafter. The features described herein can be used separately or together, or in various combinations of one or more of them.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
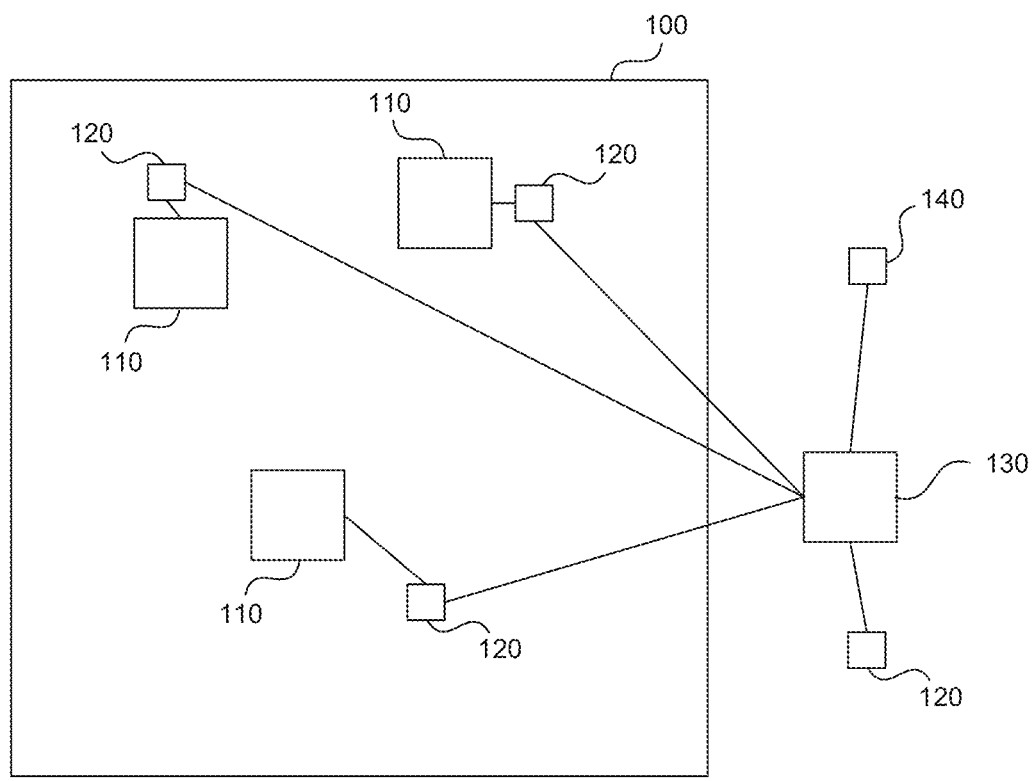
FIG. 1 is a schematic illustration of equipment, which includes one or more components functioning together or independently to perform activities associated with the equipment.

The headings provided herein are for convenience only and do not necessarily affect the scope of the embodiments. While the disclosed technology is amenable to various modifications and alternative forms, specific embodiments have been shown by way of example in the drawings and are described in detail below. The intention, however, is not to unnecessarily limit the embodiments described. Rather, the embodiments are intended to cover all modifications, combinations, equivalents, and alternatives falling within the scope of this disclosure.

DETAILED DESCRIPTION

Various embodiments of the present technology will now be described in further detail. The following description provides specific details for a thorough understanding and enabling description of these embodiments. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. Accordingly, embodiments of the present technology may include additional elements or exclude some of the elements described below with reference to the Figures, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such.

Disclosed are methods and systems for a secure integrated record of information about an asset, which a buyer, financial institution, owner, operator, or other person or entity may use to make decisions about the asset. The record can be in the form of a digitally-stored ledger. The asset can include equipment for construction, other kinds of equipment, or other assets. The information can include data about an asset, such as usage, condition, and/or maintenance information. Systems and methods according to embodiments of the present technology may apply algorithms or other processes to analyze the information in the record to determine characteristics about the asset. Embodiments of the present technology can store the characteristics in the record, optionally along with the raw data that forms the basis of the characteristics. A user can use the characteristics and/or the raw data to determine a perceived value of the asset and/or to estimate costs or timing of maintenance of the asset, among other aspects described below in further detail. Users of the record can include equipment dealers, customers, manufacturers, and/or financial institutions, which can rely on the systems and methods disclosed herein to make decisions associated with financing, leasing, purchasing, risk management, and/or maintenance. A computing device can implement and operate the record to provide information about an asset to a user. The record can be secure. For example, information may be immutably saved to the record and/or the record may be read or written only by selected parties. Accordingly, methods and systems configured in accordance with embodiments of the present technology improve the functionality of computer-based recordkeeping and analysis by providing a secure integrated record of information about an asset. Aspects of embodiments of the present technology are described in further detail below.

FIG. 1 is a schematic illustration of an asset 100, which may be a vehicle, construction equipment, an aircraft, marine equipment, railway equipment (such as a train), or another machine. The asset 100 may include one or more components 110 functioning together or independently to perform activities associated with the purpose of the asset 100. For example, the one or more components 110 can include a body or frame, an engine (and components thereof), a transmission, input devices (such as steering components), tires, tracks, hydraulic systems, brakes, and/or other components. The one or more components 110 may be subject to routine wear, abuse, maintenance, replacement, and/or repairs during the life of the asset 100.

In some embodiments, the asset 100 is coupled with one or more sensors 120 connected and/or otherwise arranged to observe aspects of the one or more components 110. For example, the asset 100 may include the one or more sensors 120. In some embodiments, the sensors 120 are separate from the asset 100 (e.g., not part of the asset 100) and include tools or other devices for measuring or analyzing aspects of the asset 100 and/or aspects of the one or more components 110. For example, the sensors 120 can include one or more fluid condition sensors, fluid temperature sensors, fluid quantity sensors, fluid pressure sensors, exhaust characteristic sensors (such as sensors for measuring temperature, exhaust ingredients, particulate matter, and/or other aspects of exhaust), runtime sensors (such as clocks and/or timers), sensors for analyzing fuel usage, position and/or velocity sensors (such as global positioning system receivers, inertial navigation sensors, or other suitable sensors for position and/or velocity), inertial measurement units, engine speed sensors, load sensors (for example, engine load sensors and/or structural load sensors), throttle position sensors, or any other telematics sensors or other sensors for analyzing an aspect of the asset 100 and/or one or more components 110 thereof. Fluid can include oil, hydraulic fluid, water, coolant, fuel, or any other fluid associated with the asset 100 and/or a component 110 thereof.

Although the sensors 120 can be connected to the asset 100, in some embodiments, the sensors 120 can be separate from the asset 100. For example, in some embodiments, a sensor 120 can include one or more aspects of a mobile device (such as a smartphone, mobile sensor, and/or other mobile tool) to detect and/or analyze location, vibration, temperature, and/or other aspects of the asset 100 and add that data to the record.

The sensors 120 may provide sensor data associated with characteristics of the components 110, such as characteristics associated with use, damage, wear, weakening, failure, or other aspects. The sensors 120 may include, and/or may be connected to one or more computing devices 130. The sensors 120 and the one or more computing devices 130 may work with each other to collect raw or partially processed data about the components 110 and/or the asset 100.

In addition to sensor data from the sensors 120, the one or more computing devices 130 can receive input data from a user through one or more user input interfaces 140, such as a keyboard, mouse, scanner, camera, data input port, or other suitable input interface 140. The input data can include information about the asset 100 and/or the one or more components 110 such as ownership information, lien information, maintenance information (which may include information about parts and/or services, such as invoice or work order data from maintenance activities, which may include labor and/or component replacement information), damage information, and/or other information related to the condition, ownership, and/or other aspects of the asset 100 and/or the one or more components 110 thereof.

The sensor data from the sensors 120, and/or the input data from the input interfaces 140 or other input data, may collectively be referred to as the asset data collection. The asset data collection may be stored in one or more databases associated with the one or more computing devices 130. The asset data collection may include a large amount of data about the asset 100 and/or the components 110. The asset data collection may include an abundance of information about the asset 100, but the raw information in the asset data collection may be too vast or otherwise too raw to convey to a user objective and/or subjective characteristics about the overall usage, maintenance, and/or condition of the asset 100.

Embodiments of the present technology (systems and methods) store or otherwise retain the asset data collection in a manageable secure integrated record, along with characteristics determined about the asset 100 based on the raw information in the asset data collection, which characteristics are added to the asset data collection. Embodiments of the present technology (systems and methods) improve computer functionality by providing a manageable secure integrated record of the asset data collection and characteristics determined by analysis of the asset data collection, as explained in additional detail below.

Figure 2:
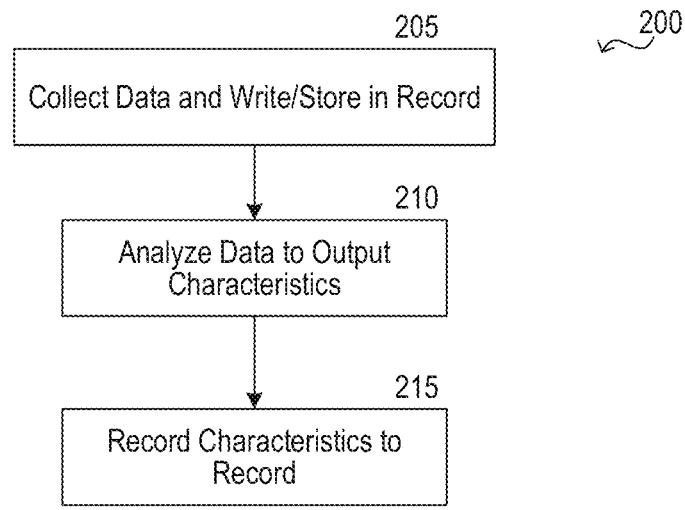
FIG. 2 is a flow diagram illustrating a method of creating and/or using an integrated record of asset usage, maintenance, and/or condition.

FIG. 2 is a flow diagram illustrating a method 200 of creating and/or using an integrated record of asset usage, maintenance, and/or condition, in accordance with embodiments of the present technology. Beginning at step 205, the one or more computing devices 130 collect the asset data collection (e.g., sensor data from the sensors 120 and/or the input data from the input interfaces 140). The one or more computing devices 130 record the asset data collection in a record, such as a ledger. For example, the ledger may include a blockchain distributed across several of the one or more computing devices 130 in a network such as the Internet and/or a local network. Accordingly, in some embodiments, the record may be secure due to the nature of the blockchain structure. In some embodiments, the record and/or ledger may be stored in a centralized computer database with security protocols for access and/or editing by permitted parties (such as owners, dealers, maintenance shops, etc.). During or after the relevant life of the asset 100, the asset data collection can subsist and/or grow in the record as the asset 100 is used, maintained, sold, or otherwise affected. For example, a stream of all of the telematics data or all of any other data streams associated with the asset 100 may be saved to the record. In some embodiments, a system can include one or more edge devices to facilitate contemporaneous data into the ledger.

At step 210, the one or more computing devices 130 may analyze at least a portion of the asset data collection in the record. The one or more computing devices 130 may analyze the data periodically or on demand from a user or from an instruction from another system. The analysis can include one or more subroutines or modules that determine and output usage, maintenance, condition, value, and/or other characteristics of the asset 110 based on the asset data collection. Representative subroutines or modules are described in additional detail below with regard to FIG. 3. The system may perform the analysis on demand from a person requesting the process via input to the one or more computing devices 130, or periodically such as yearly, monthly, weekly, and/or on another periodic basis. In some embodiments, the algorithms associated with the subroutines or modules can also be stored in the record.

In some embodiments, in addition to, or as an alternative to analyzing data from actual sensors or input from users based on actual sensors, the one or more computing devices 130 may perform analysis based on a virtual model of the asset 100 or a system or component of the asset 100. Such analysis may also be called digital twin modeling, and it may be useful in situations in which it is not feasible to include sensors in an asset 100 or in a system or component of the asset 100. In a specific example, a digital twin simulation of a catalytic converter may determine the temperature to which the platinum-based catalyst inside the catalytic converter is exposed during operation, based on sensor data associated with another aspect of the catalytic converter and physics-based modeling. Accordingly, in some embodiments, the one or more computing devices 130 can store a virtual model of the asset 100 or a system or component of the asset 100, to which the one or more computing devices 130 can input hypothetical values, observed values, or other values to determine output based on the virtual model. The output of the virtual model may further be stored in the record. In general, an asset 100 and sensors 120 or other inputs in embodiments of the present technology need not be real-world elements. Rather, in some embodiments, they may be virtual twins or models that facilitate physics-based modeling that enables analysis of aspects of the assets 100 that are otherwise unable to be monitored by real-world sensors.

At step 215, the one or more computing devices 130 may record the characteristics from step 210 in the record with the existing asset data collection to form the aggregate (integrated) asset data collection.

Information written to the record in steps 205 and/or 215 may be digitally signed, immutable (or optionally, capable of revision with tracking of revisions and who performed the revision), and/or may include the identity of the contributor of the information. As a result, the information in the record is reliable and trustworthy. In some embodiments, the system may only allow certain parties to access and/or edit the record. The record forms a secure digital certificate of information about the asset that may function as a summary of the life of the asset.

Figure 3:
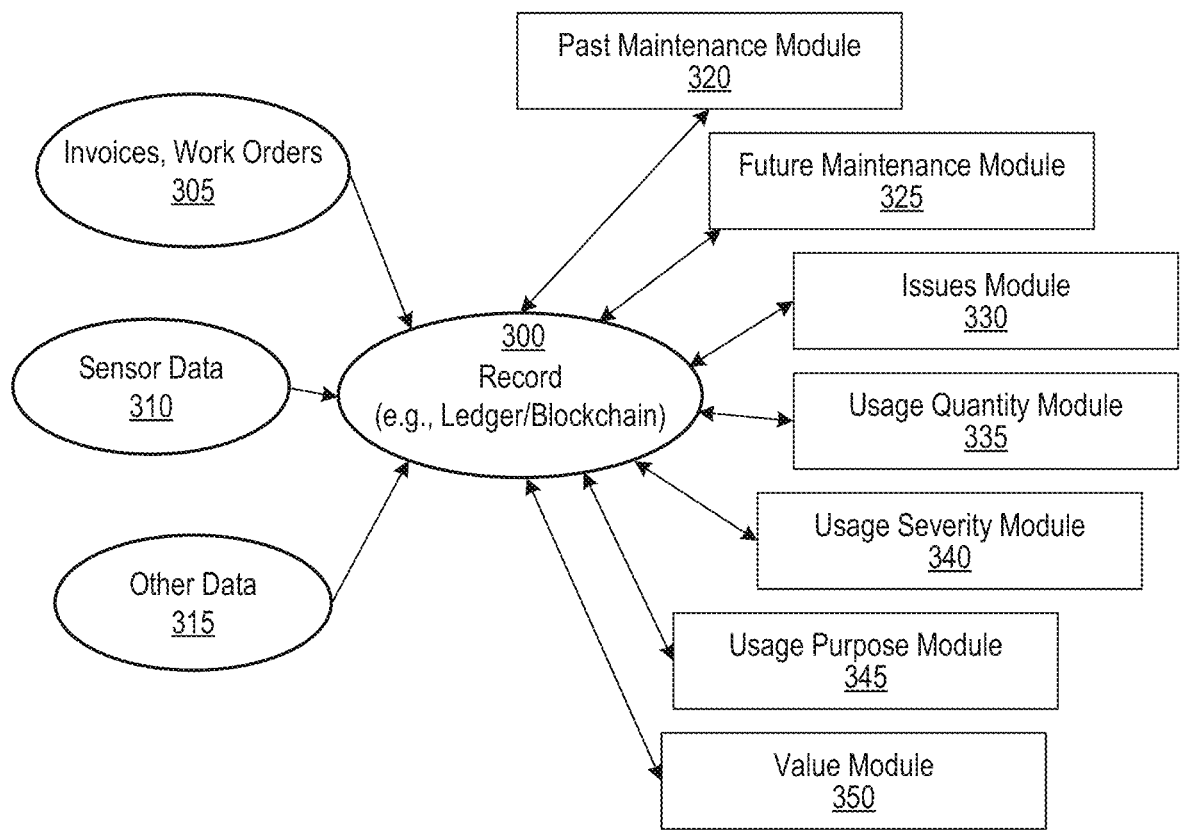
FIG. 3 illustrates a schematic view of a record, inputs to the record, and one or more subroutines or modules that receive information from an aggregate asset data collection, analyze the information, and return characteristics about the asset to the record where they become part of the aggregate asset data collection.

FIG. 3 illustrates a schematic view of a record 300, inputs 305, 310, 315 to the record 300, and one or more subroutines or modules 320, 325, 330, 335, 340, 345, and/or 350 that receive information from the aggregate asset data collection, analyze the information, and return characteristics about the asset to the record 300 where they become part of the aggregate asset data collection, in accordance with embodiments of the present technology. The subroutines or modules 320-350 may be stored and/or executed in one or more of the computing devices 130.

The inputs 305, 310, 315 may include data from invoices, work orders, sensor data, and/or other data. Other data may include inspection information, insurance information, accident reports, recall information, information input from a dealer or customer, or other information relevant to an asset 100. Each of the subroutines or modules 320-350 include algorithms or other analysis tools that receive information from the aggregate asset data collection in the record 300, analyze the information, and, optionally, return the results of the analysis (e.g., characteristics of the asset 100) to the record 300 to save in the record 300.

In some embodiments, a Past Maintenance Module 320 analyzes data relevant to a determination of how the asset 100 was maintained, for example, if and/or when a component was replaced, rebuilt, or otherwise serviced. Relevant data can include parts lists and/or labor descriptions from invoices and work orders that correlate to typical service activities. The Past Maintenance Module 320 may include an algorithm and/or database that correlates the parts lists and/or labor descriptions to service activities, and which generates a history, score, or other relevant characteristic about the past maintenance of the asset 100.

In some embodiments, a Future Maintenance Module 325 may analyze past maintenance data, usage data, and/or condition data to determine future maintenance needs and/or costs (forecasting). For example, the Future Maintenance Module 325 may determine that an asset can be used for 500 more hours or miles before required maintenance, and/or estimate a calendar time to failure based on past usage trends. In another example, the Future Maintenance Module 325 can estimate the remaining useful life of components based on the sensor data from the components (such as fault codes and/or telematics data) and flag components that are expected to fail and/or which will not reach their design life. In some embodiments, the Future Maintenance Module 325 can determine expected maintenance costs over a time period (such as a future time period). Any of the foregoing characteristics and identification of the corresponding components may be saved to the record as relevant characteristics.

An Issues Module 330 may analyze fault codes (which may be from sensor data), recalls, and/or other issues to generate a characteristic or description of past or current issues or problems with the asset 100. Other issues may include aspects of an asset operator, such as whether an operator was insufficiently experienced, having a health crisis during operation of the asset, and/or under the influence of drugs or alcohol. Such information may be input to the record 300 by a user and analyzed and/or summarized by the Issues Module 330 to generate one or more characteristics of past and present operators of the asset.

A Usage Quantity Module 335 may analyze how much the asset 100 was used, in hours of operating time, number of days, or another relevant quantity to assign a characteristic or description of the quantity of use to the asset 100. Other relevant factors for analysis by the Usage Quantity Module 335 can include a number of shovels of earth moved, a distance of road compacted, and/or a length of trench dug, depending at least in part on the type of asset.

A Usage Severity Module 340 may estimate the harshness or severity of use of the asset 100. For example, the Usage Severity Module 340 can analyze fuel use rate, average or mean engine speed (e.g., revolutions per minute (RPM)), work time, number of gear shifts, and/or average or mean speed (all of which may be included in the sensor data) to assign a severity or harshness score to the asset 100 at a point in time, which may help a user understand and compare the severity of use of the asset 100 to that of other assets. In some embodiments, the Usage Severity Module 340 may use usage data to determine a longevity score.

A Usage Purpose Module 345 can analyze telematics data or other data to determine one or more characteristics about the activities the asset 100 performed. For example, the Usage Purpose Module 345 may provide a fractional and/or percentage breakdown of the types of use or activities of the asset 100. In a particular example relevant to construction equipment, the Usage Purpose Module may analyze data from the asset data collection to determine the percentage of time the equipment spent moving dirt, idling, traveling, excavating, and/or other activities. The breakdown can be stored in the record 300 for access by a user.

A Value Module 350 may analyze any of the information in the aggregate asset data collection stored in the record 300, including any of the information and/or characteristics (which may also be called "insights") determined by the Past Maintenance Module 320, Future Maintenance Module 325, Issues Module 330, Usage Quantity Module 335, Usage Severity Module 340, and/or Usage Purpose Module 345. The Value Module 350 may implement weighted scoring formulas and/or other algorithms to determine one or more of the following:

a) Residual Value (e.g., resale value), based on maintenance, usage, and/or condition history, including information about the effect of certain kinds of maintenance or certain entities performing the maintenance on the asset 100;
b) Refurbishment Values, for example, a determination of the increase in Residual Value for certain maintenance and/or refurbishment activities required as indicated by one or more of the Modules 320-345;
c) Operating Costs, for example, the total cost of maintenance, fuel, or other aspects of the asset 100 on an hourly, yearly, lifetime, or other basis;
d) Time to Next Major Repair, for example, an indication of when the asset 100 will need repair;
e) Financing Risk, for example, a customer's overuse or poor maintenance of an asset in the past informs a larger risk placed on a new asset for financing, or conversely, light use and good maintenance presents lower risk for financing; and/or
f) The Value of a note for a loan or lien on the asset, based at least in part on the usage and condition reported by the Modules 320-345.

In general, any of the one or more modules 320-350 can generate forecasts of asset issues or usage based on existing trends. Other characteristics can include expected fuel consumption, expected carbon emissions, or other characteristics associated with future aspects of the asset 100.

In some embodiments, the characteristics provided by the modules 320-350 can include specific numerical values, dates, ranges of numerical values, ranges of dates, probability distributions (e.g., an asset was performing an activity some percentage of a time period, or other probability distributions), and/or other characteristics.

Systems configured in accordance with some embodiments of the present technology may further input information and/or data about other assets into the record 300, such as assets other than the main asset forming the focus of the record 300. Additionally or alternatively, systems configured in accordance with some embodiments of the present technology can access other records associated with other assets. In some embodiments, any one or more of the modules 320-350 can compare the asset 100 to other assets, such as other assets in a fleet of assets or another population. For example, a determined characteristic can include a relative comparison between the asset 100 and other assets. In a specific example, a determined characteristic can include a comparison of wear on the asset 100 relative to wear on other assets having similar usage histories or other histories. In some embodiments, the system can generate a characteristic of maintenance costs relative to other assets.

In some embodiments, the subroutines or modules 320-350 may be stored in the record 300, retrieved from the record 300, and executed in one or more of the computing devices 130. For example, an algorithm associated with the Usage Severity Module 340 can be stored in the record 300. In a specific example, the Usage Severity Module 340 can determine a percentage of asset life consumed between two dates. An example of storing the algorithm in the record 300 can include storing one or more text strings defining the code to execute the algorithm. An advantage of this approach is that all results could be securely and automatically restated based on updated computational methods, because the algorithm in the record 300 can be updated. In some embodiments, the record 300 may store all versions of an algorithm, which would enable a user or system to determine the relevance or accuracy of a decision resulting from that algorithm. In some embodiments, the algorithms can be accessed from the record via an application programming interface (API) in the one or more computing devices 130 or in other computers or computing systems disclosed herein. In some embodiments, the algorithms/modules can be executed using structured query language (SQL) that triggers the algorithm/module code to run via an auxiliary interpreter. An example SQL query could include "SELECT BEARING WEAR WHERE START=04/01/2021 AND END=06/30/2021)." Such a query would support a graphical user interface (GUI) in the form of a dashboard with critical information about an asset that is periodically updated and/or updated on-demand.

In general, the Record 300, the data (from the inputs 305, 310, and/or 315), and the Modules 320-350 provide analytics for the dealer, the manufacturer, the reseller, the maintenance shop, and/or other relevant parties to use in making risk and financial decisions about the asset 100. For example, a dealer with a large fleet of rental equipment may need to know when to remove something from the fleet and sell it on the used market. The dealer can use the systems and methods disclosed herein to learn the value of the asset (such as the Residual Value), upcoming maintenance costs (for example, from the Future Maintenance Module 325), or other relevant information to make a fast and informed decision about the timing and value of selling the asset. A loan officer may view the Record 300 to determine a user's Financing Risk. A contract for a loan may include a provision that the equipment is not used to an extensively severed degree, as objectively measured by the Usage Severity Module and updated periodically in the Record 300.

In some embodiments, systems can include a display and a graphical user interface (GUI) on the display that facilitates entering data into the system and receiving data from the system. For example, in some embodiments, a GUI can include a textbox or other entry field to receive an identification number of an asset, along with a calendar for selecting start and end dates for the desired analysis and information. In some embodiments, a GUI can include a histogram showing a percentage of time an asset was operating at various intensity levels (e.g., associated with the Usage Severity Module 340). In some embodiments, the GUI can include one or more data entry fields for receiving a structured query language (SQL) query, such as "SELECT USAGE_INTENSITY FROM LEDGER WHERE SN=12345 AND START DATE=04/01/2021 AND END DATE=06/30/2021." Other embodiments can include other GUIs and/or data entry fields.

Accordingly, systems and methods according to embodiments of the present technology provide an integrated record of asset usage, maintenance, and/or condition that may be stored in a ledger, such as a blockchain, on one or more computing devices. The one or more computing devices may further include modules for analyzing the record and adding characteristics about the asset to the record. Accordingly, computer recordkeeping and analysis of assets is improved by providing the integrated record, which is secure, comprehensive, and reliable as a result of it being secure and comprehensive.

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause one or more computers, microprocessors, processors, and/or microcontrollers (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 4:
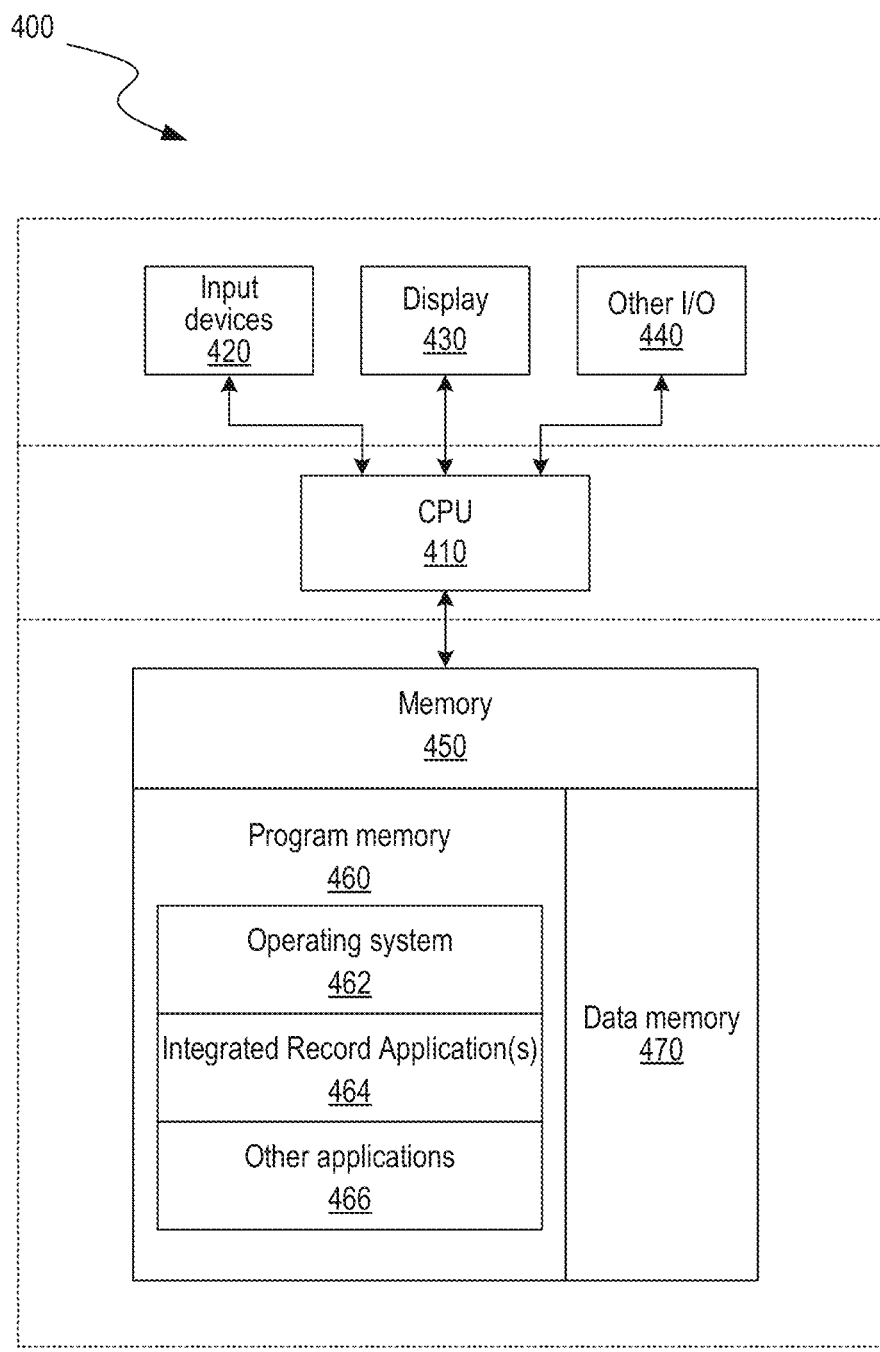
FIG. 4 is a block diagram illustrating an overview of systems and/or devices on which some implementations can operate.

Several implementations are discussed below in more detail in reference to the figures. FIG. 4 is a block diagram illustrating an overview of devices on which some implementations of the disclosed technology can operate. The devices can comprise hardware components of a system 400 (which can be a device or a combination of devices, or another suitable system) that stores and uses the integrated record of asset usage, maintenance, condition, and/or other aspects, according to embodiments of the present technology. The system 400 can include or be part of the computing device 130 described above. The system 400 can include one or more input devices 420 (which may include the input interfaces 140 described above) that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics associated with the asset data collection, the characteristics of the asset, and/or other aspects of embodiments of the present technology. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, sensor, camera, printer, speakers, CD-ROM drive, DVD drive, disk drive, or Blu-Ray device.

In some implementations, the system 400 also includes a communication device (optionally, as one of the Other I/O devices 440) capable of communicating wirelessly or wire-based with a network node. The communication device can communicate with another device or a server through a network using, for example, TCP/IP protocols. System 400 can utilize the communication device to distribute operations across multiple network devices. For example, such a communication device may receive and/or transmit data from the sensors 120 to the computing device 130 and/or the system 400. In some embodiments, the Other I/O devices 440 can include the sensors 120.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, Integrated Record Application 464 (which may include instructions for carrying out the methods of collecting, analyzing, and writing the collective asset data into the Record 300, optionally further including one or more of the Modules 320-345), and other application programs 466. Memory 450 can also include data memory 470 that can include database information, etc., which can be provided to the program memory 460 or any element of the system 400. The Data memory 470 can include the record, such as in a ledger or blockchain format.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
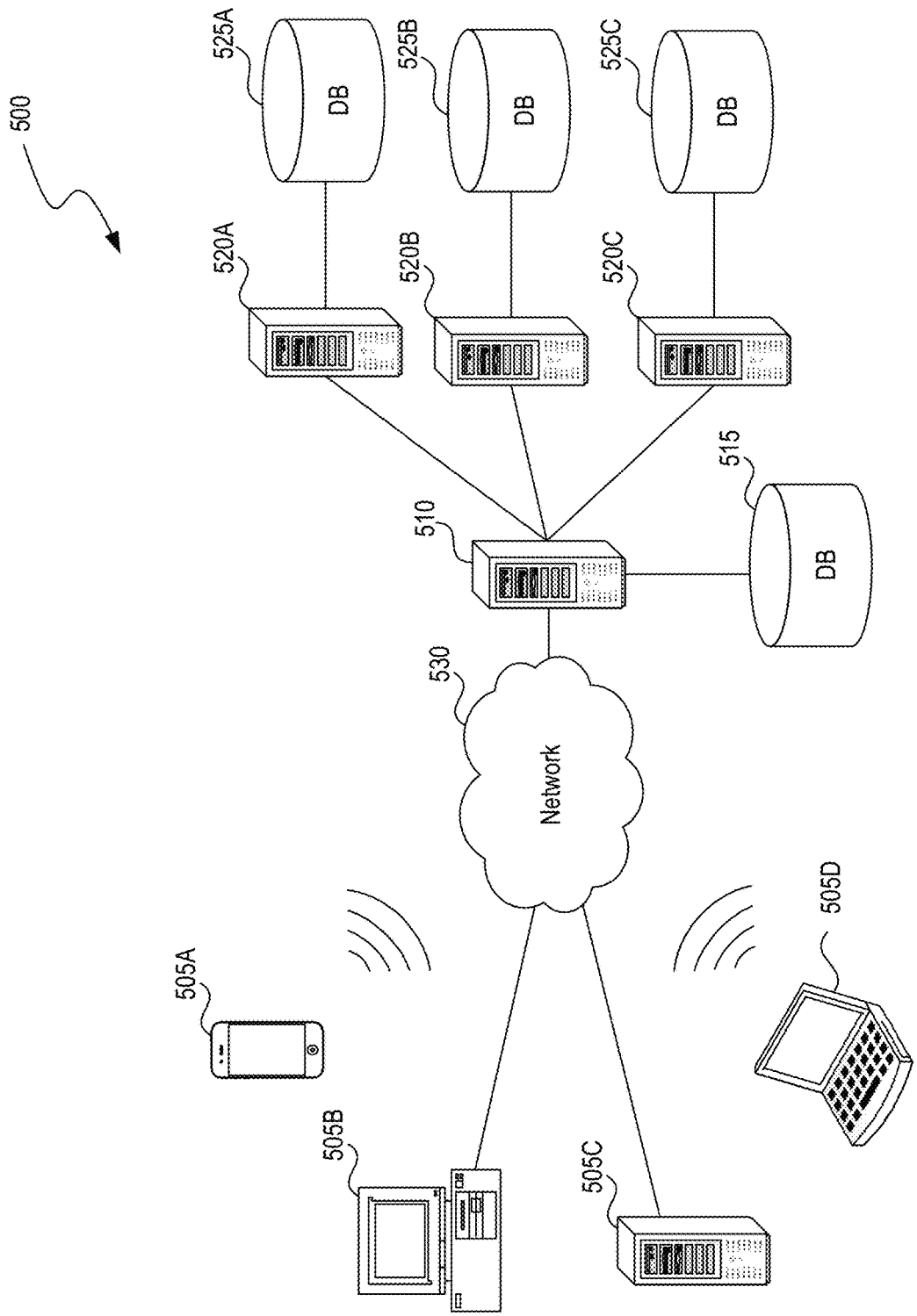
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include the system 400 (which can be embodied in a device and/or combination of devices). Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and 520 can comprise computing systems, such as the system 400. Though each server computing device 510 and 520 is displayed logically as a single server, server computing devices can each be a distributed computing environment encompassing multiple computing devices located at the same or at geographically disparate physical locations. In some implementations, each server computing device 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. Each server 520 can correspond to a group of servers, and each of these servers can share a database or can have their own database. Databases 515 and 525 can warehouse (e.g., store) information, such as the asset data collection. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
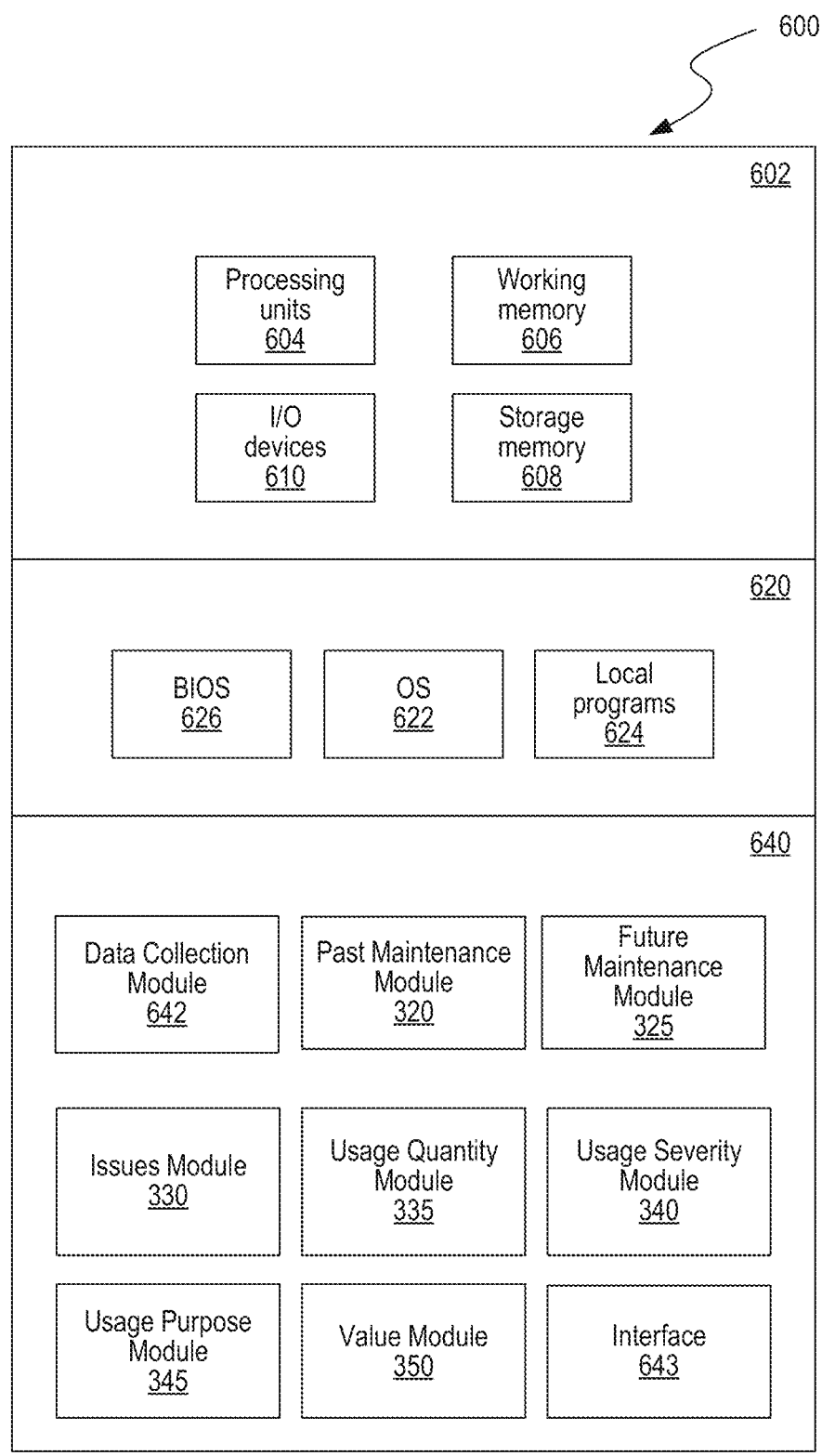
FIG. 6 is a block diagram illustrating elements which, in some implementations, can be used in a system employing the disclosed technology.

FIG. 6 is a block diagram illustrating elements 600 which, in some implementations, can be used in a system employing the disclosed technology. The elements 600 include hardware 602, general software 620, and specialized elements 640. As discussed above, a system implementing the disclosed technology can use various hardware, including processing units 604 (e.g., CPUs, GPUs, APUs, etc.), working memory 606, storage memory 608, and input and output devices 610. Elements 600 can be implemented in a client computing device such as client computing devices 505 or on a server computing device, such as server computing device 510 or 520.

General software 620 can include various applications, including an operating system 622, local programs 624, and a basic input output system (BIOS) 626. Specialized components 640 can be subcomponents of a general software application 620, such as local programs 624, which may include the Integrated Record Application 464 (see FIG. 4 and description above). Specialized elements 640 can include the Past Maintenance Module 320, the Future Maintenance Module 325, the Issues Module 330, the Usage Quantity Module 335, the Usage Severity Module 340, the Usage Purpose Module 345, the Value Module 350, a Data Collection Module 642, and components that can be used for transferring data and controlling the specialized components, such as an Interface 643. In some implementations, elements 600 can be in a computing system that is distributed across multiple computing devices or can be an interface to a server-based application executing one or more of specialized elements 640.

Those skilled in the art will appreciate that the components illustrated in FIGS. 4-6 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, systems for creating the integrated record can include the Past Maintenance Module 320, the Future Maintenance Module 325, the Issues Module 330, the Usage Quantity Module 335, the Usage Severity Module 340, the Usage Purpose Module 345, the Value Module 350, the Data Collection Module 642, the Record 300, the sensors 120, along with systems and/or databases associated with storing and transmitting the input data 305, 310, 315 (FIGS. 3, 6), and/or other elements disclosed herein.

In operation, the sensors 120 provide sensor data associated with characteristics of the components 110 and/or the asset 100 overall. The Data Collection Module 642 collects various data associated with step 205 in FIG. 2, such as data from the sensor 120, invoice data, work order data, and/or other data. The Data Collection Module 642 causes the various data to be stored in the Record 300, which may be maintained in a ledger format, a blockchain format, and/or one or more databases associated with the one or more computing devices 130 and/or the system 400. The Past Maintenance Module 320 analyzes data relevant to a determination of how the asset 100 was maintained, for example, if and/or when a component was replaced, rebuilt, or otherwise serviced, and saves the determination (characteristic) to the Record 300. The Future Maintenance Module 325 may analyze past maintenance data, usage data, and/or condition data to determine future maintenance requirements (e.g., if maintenance is required, when it may be required, and what maintenance may be required), and saves the determination (characteristic) to the Record 300. The Issues Module 330 may analyze fault codes (which may be from sensor data), recalls, and/or other issues to generate a characteristic or description of past or current issues or problems with the asset 100. The Usage Quantity Module 335 may analyze how much the asset 100 was used, in hours of operating time, number of days, or another relevant time or quantity to assign a characteristic or description of the quantity of use to the asset 100. The Usage Severity Module 340 may estimate the harshness or severity of use of the asset 100. The Usage Purpose Module 345 analyzes telematics data or other data to determine one or more characteristics about the activities the asset 100 performed. The Value Module 350 determines characteristics related to value and/or risk associated with the asset, as explained in additional detail above with regard to FIG. 3. Each of the modules 320, 325, 330, 335, 340, 345, 350, and 642 can read and write to the Record 300. In some embodiments, the Interface 643 facilitates input and output to and from the Record 300 via the Data Collection Module 642, and/or via another module.

General software 620 may include instructions to repeat one or more, or even all of the steps of the method 200 (see FIG. 2) at selected increments of time to continually or periodically update the Record, or on demand from a user via an interface.

The disclosed technology, therefore, creates and maintains a secure integrated record of information about an asset 100. In some embodiments, the record 300 may include data about multiple assets in parallel.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the term "and/or" when used in the phrase "A and/or B" means "A, or B, or both A and B." A similar manner of interpretation applies to the term "and/or" when used in a list of more than two terms.

What is claimed is:

1. A computer-implemented method for improving recordkeeping of an asset, the method comprising creating and maintaining a single an integrated record about the asset, the method comprising:
   collecting data about the asset to form an asset data collection including data from a first sensor coupled to the asset;
   collecting the data about the asset to add to the asset data collection by:
       simulating an operation of the asset on a computing device by creating a virtual model of the asset on the computing device and a virtual model of a second sensor on the computing device,
           wherein an operation of the virtual model of the asset mimics the operation of the asset, and an operation of the virtual model of the second sensor mimics the operation of the second sensor; and
       collecting the data about the asset to add to the asset data collection by obtaining an output from the virtual model of the second sensor;
   recording the asset data collection in a record;
   analyzing at least a portion of the asset data collection in the record to determine a characteristic of the asset,
       wherein the characteristic of the asset includes an indication of time to complete a repair;
   based on the indication of time to complete the repair, performing the repair; and
   recording the characteristic of the asset in the record, wherein recording the characteristic in the record comprises adding the characteristic to the asset data collection in the record.

2. The method of claim 1, wherein collecting the data comprises receiving information from one or more sensors.

3. The method of claim 2, wherein receiving information from one or more sensors comprises receiving information from two or more different sensors selected from a list comprising: a fluid quantity sensor, a fluid pressure sensor, an exhaust characteristic sensor, a fuel usage sensor, a position and/or velocity sensor, a load sensor, and a throttle position sensor.

4. The method of claim 1, wherein collecting the data comprises receiving information from one or more input interfaces.

5. The method of claim 1, wherein recording the asset data collection in the record comprises recording the asset data collection in a blockchain ledger.

6. The method of claim 1, wherein analyzing at least a portion of the asset data collection comprises at least one of:
   (a) determining a characteristic of past maintenance of the asset based on maintenance information in the asset data collection;
   (b) determining a characteristic of future maintenance needs of the asset based on information from one or more sensors coupled with the asset;
   (c) determining a characteristic of activities the asset performed; or
   (d) determining a characteristic of a financial value of the asset.

7. The method of claim 1, wherein recording the asset data collection comprises recording an identity of a contributor to the asset data collection.

8. The method of claim 1, wherein analyzing at least a portion of the asset data collection to determine a characteristic comprises determining a severity of usage of the asset based on a number of gear shifts experienced by the asset, an average or mean speed of the asset, an average or mean engine speed of the asset.

9. A system for improving recordkeeping of an asset with an integrated record about the asset, the system comprising:
   one or more processors; and
   one or more memory devices having stored thereon instructions that when executed by the one or more processors cause the one or more processors to:
   collect data about the asset to form an asset data collection including data from a first sensor coupled to the asset;
   collect the data about the asset to add to the asset data collection by:
      simulating an operation of the asset on a computing device by creating a virtual model of the asset on the computing device and a virtual model of a second sensor on the computing device,
         wherein an operation of the virtual model of the asset mimics the operation of the asset, and an operation of the virtual model of the second sensor mimics the operation of the second sensor; and
      collecting the data about the asset to add to the asset data collection by obtaining an output from the virtual model of the second sensor;
   record the asset data collection in a record;
   analyze at least a portion of the asset data collection in the record to determine a characteristic of the asset;
      wherein the characteristic of the asset includes an indication of time to complete a repair;
   based on the indication of time to complete the repair, performing the repair; and
   record the characteristic of the asset in the record, wherein recording the characteristic in the record comprises adding the characteristic to the asset data collection in the record.

10. The system of claim 9, further comprising one or more sensors connected to the asset, and wherein collecting the data comprises receiving information from the one or more sensors.

11. The system of claim 10 wherein the one or more sensors comprises at least one of: an exhaust characteristic sensor, a fuel usage sensor, a position and/or velocity sensor, a load sensor, or a throttle position sensor.

12. The system of claim 9, wherein collecting the data comprises receiving information from one or more input interfaces.

13. The system of claim 9, wherein recording the asset data collection in the record comprises recording the asset data collection in a blockchain ledger.

14. The system of claim 9, wherein analyzing at least a portion of the asset data collection comprises at least one of:
   (a) determining a characteristic of past maintenance of the asset based on maintenance information in the asset data collection;
   (b) determining a severity of usage of the asset based on a number of gear shifts experienced by the asset, an average or mean speed of the asset, an average or mean engine speed of the asset;
   (c) determining a characteristic of activities the asset performed; or
   (d) determining a characteristic of a financial value of the asset.

15. The system of claim 9, wherein analyzing at least a portion of the asset data collection to determine a characteristic comprises determining a characteristic of future maintenance needs of the asset based on information from one or more sensors coupled with the asset.

16. One or more non-transitory computer-readable media storing computer-executable instructions that, when executed by one or more processors, cause the one or more processors to perform operations comprising:
   collecting data about an asset to form an asset data collection including data from a first sensor coupled to the asset;
   collecting the data about the asset to add to the asset data collection by:
      simulating an operation of the asset on a computing device by creating a virtual model of the asset on the computing device and a virtual model of a second sensor on the computing device,
         wherein an operation of the virtual model of the asset mimics the operation of the asset, and an operation of the virtual model of the second sensor mimics the operation of the second sensor; and
      collecting the data about the asset to add to the asset data collection by obtaining an output from the virtual model of the second sensor;
   recording the asset data collection in a record;
   analyzing at least a portion of the asset data collection in the record to determine a characteristic of the asset;
      wherein the characteristic of the asset includes an indication of time to complete a repair;
   based on the indication of time to complete the repair, performing the repair; and
   recording the characteristic of the asset in the record, wherein recording the characteristic in the record comprises adding the characteristic to the asset data collection in the record.

17. The media of claim 16, wherein the operations further comprise collecting the data from one or more sensors.

18. The media of claim 17, wherein collecting the data from one or more sensors comprises receiving information from two different sensors selected from a list comprising: a fluid pressure sensor, an exhaust characteristic sensor, a fuel usage sensor, a position and/or velocity sensor, and a throttle position sensor.

19. The media of claim 16, wherein collecting the data comprises receiving information from one or more input interfaces.

20. The media of claim 16, wherein recording the asset data collection in the record comprises recording the asset data collection in a blockchain ledger.

21. The media of claim 16, wherein analyzing at least a portion of the asset data collection comprises at least one of:
  (a) determining a characteristic of past maintenance of the asset based on maintenance information in the asset data collection;
  (b) determining a characteristic of future maintenance needs of the asset based on information from one or more sensors coupled with the asset;
  (c) determining a severity of usage of the asset based on a number of gear shifts experienced by the asset, an average or mean speed of the asset, an average or mean engine speed of the asset; or
  (d) determining a characteristic of activities the asset performed.

22. The media of claim 16, wherein analyzing at least a portion of the asset data collection to determine a characteristic comprises determining a characteristic of a financial value of the asset.

23. The media of claim 22, wherein determining a characteristic of a value of the asset comprises determining at least one of a residual value, operating costs, or financing risk.

* * * * *